(12) United States Patent
Li (10) Patent No.: US 12,197,011 B2
(45) Date of Patent: Jan. 14, 2025

(54) OPTICAL WAVEGUIDE SYSTEM, AND ELECTRONIC DEVICE

(71) Applicant: Goertek Inc., Shandong (CN)

(72) Inventor: Lingshan Li, San Jose, CA (US)

(73) Assignee: Goertek Inc., Shandong (CN)

( * ) Notice: Subject to any disclaimer, the term of this patent is extended or adjusted under 35 U.S.C. 154(b) by 422 days.

(21) Appl. No.: 17/666,678

(22) Filed: Feb. 8, 2022

(65) Prior Publication Data

US 2023/0251425 A1   Aug. 10, 2023

(51) Int. Cl.
*G02B 6/27* (2006.01)

(52) U.S. Cl.
CPC .................... *G02B 6/2726* (2013.01)

(58) Field of Classification Search
CPC .................................................. G02B 6/2726
See application file for complete search history.

(56) References Cited

U.S. PATENT DOCUMENTS

| | | |
|---|---|---|
| 11,067,811 B2 | 7/2021 | Chi et al. |
| 11,119,343 B2 | 9/2021 | Geng et al. |
| 11,150,408 B2 | 10/2021 | Waldern et al. |
| 2005/0231661 A1* | 10/2005 | Lazarev ............. G02F 1/13473 349/106 |
| 2020/0081252 A1 | 3/2020 | Jamali et al. |
| 2021/0055551 A1 | 2/2021 | Chi et al. |
| 2022/0086419 A1* | 3/2022 | Qaderi .................... G03H 1/02 |

FOREIGN PATENT DOCUMENTS

| | | | |
|---|---|---|---|
| CN | 1502059 A | * 6/2004 | ........... G02B 5/3016 |
| CN | 103246104 A | * 8/2013 | |

OTHER PUBLICATIONS

"Nanoscale liquid crystal polymer Bragg polarization gratings" by Xiang X, Kim J, Komanduri R, Escuti MJ in Opt Express. 2017;25(16):19298. doi: 10.1364/OE.25.019298.
"Bragg polarization gratings for wide angular bandwidth and high efficiency at steep deflection angles" by Xiang X, Kim J, Escuti MJ in Sci Rep. 2018;8(1):7202. doi: 10.1038/s41598-018-25535-0.

(Continued)

*Primary Examiner* — Chris H Chu
(74) *Attorney, Agent, or Firm* — Baker Botts LLP (57) ABSTRACT

An optical waveguide system and an electronic device are disclosed. The optical waveguide system comprises: a waveguide; an input coupler, coupling a light including a first and a second color component into the waveguide; and an output coupler, including: a first polarization color filter, converting the first color component of a first polarization state into the first color component of a second polarization state without changing the second color component of the first polarization state; a first polarization volume grating, coupling the first color component out of the waveguide; a second polarization color filter, converting the second color component of the first polarization state into the second color component of the second polarization state without changing the first color component of the first polarization state; a second polarization volume grating, coupling the second color component out of the waveguide.

7 Claims, 12 Drawing Sheets

(56) References Cited

OTHER PUBLICATIONS

"Reflective polarization volume gratings for high efficiency waveguide-coupling augmented reality displays" by Lee Y-H, Yin K, Wu S-T in Opt Express. 2017;25(22):27008. doi:10.1364/OE.25.027008.
"Polarization vol. gratings for near-eye displays and novel photonic devices" by Yin K, Zhan T, Xiong J, He Z, Wu S-T in Crystals. 2020;10(7):561.
"Improved Saturation and wide-viewing angle color filters based on muli-twist retarders" by Lingshan Li, Shuojia Shi, and Michael J. Escuti, Optics Express, vol. 29, No. 3, Feb. 2021.
"Super Achromatic wide-angle quarter-wave plates using multi-twist retarders" by Lingshan Li and Michael J. Escuti, Optics Express, vol. 29, No. 5, Mar. 2021, p. 7464-7478.
"Sole-style birefringent color filters based on multi-twist retarders" by Li L, Shi S, Escuti MJ in In: Hahlweg CF, Mulley JR, eds. Novel Optical Systems, Methods, and Applications XXIII. Vol 11483. SPIE; 2020:136-149. doi:10.1117/12.2569133.

* cited by examiner

OPTICAL WAVEGUIDE SYSTEM, AND ELECTRONIC DEVICE

FIELD OF THE INVENTION

This disclosure relates to the technical field of optical waveguide system, and more specifically, to an optical waveguide system and an electronic device.

BACKGROUND OF THE INVENTION

In an electronic device such as a near-eye displays (NEDs) system, the rays/lights emerged from displays that with certain field of view (FOV) are in-coupled to the waveguide by an input coupler grating (ICG), undergo total internal reflection (TIR) and pupil expansion and are finally out-coupled by an output coupler grating (OCG).

The article of "Nanoscale liquid crystal polymer Bragg polarization gratings" by Xiang X, Kim J, Komanduri R. Escuti MJ in Opt Express. 2017; 25 (16): 19298. doi: 10.1364/OE.25.019298 discloses nanoscale liquid crystal polymer Bragg polarization gratings, which is hereby incorporated in its whole by reference.

The article of "Bragg polarization gratings for wide angular bandwidth and high efficiency at steep deflection angles" by Xiang X, Kim J, Escuti MJ in Sci Rep. 2018; 8 (1): 7202. doi: 10.1038/841598-018-25535-0 discloses Bragg polarization gratings, which is hereby incorporated in its whole by reference.

The article of "Reflective polarization volume gratings for high efficiency waveguide-coupling augmented reality displays" by Lee Y-H, Yin K, Wu S-T in Opt Express. 2017; 25 (22): 27008. doi: 10,1364/OE.25.027008 discloses reflective polarization volume gratings, which is hereby incorporated in its whole by reference.

The article of "Volume Bragg gratings for near-eye waveguide display" by Chi W. Lee H Y, Saarikko P published online 2021 discloses volume Bragg gratings, which is hereby incorporated in its whole by reference.

The article of "Dispersion compensation in volume Bragg grating-based waveguide display" by Chi W. Meiser D, Yang Y, Lam WST, Saarikko P published online in 2021 discloses a volume Bragg grating-based waveguide display, which is hereby incorporated in its whole by reference.

The article of "Optical waveguide beam splitter with polarization volume gratings for display" by Geng Y, Gollier, Jacques in Amirsolaimani B 2021; 2 discloses an optical waveguide beam splitter, which is hereby incorporated in its whole by reference.

The article of "Polarization-sensitive components in optical systems for large pupil acceptance angles" by Amali A, Lu L, Maimone A, Moheghi A, Lam WST, McEldowney, S. Charles Lanman DR published online in 2020 discloses polarization-sensitive components, which is hereby incorporated in its whole by reference.

The article of "Holographic waveguides incorporating bitefringence control and methods for their fabrication" by David W J, Popvich M, Grant AJ in Search published online in 2021, discloses holographic waveguides, which is hereby incorporated in its whole by reference.

The article of "Polarization volume gratings for near-eye displays and novel photonic devices" by Yin K, Zhan T, Xiong J. He Z, Wu S-T in Crystals. 2020; 10 (7): 561 discloses polarization volume gratings, which is hereby incorporated in its whole by reference.

The article of "Super achromatic wide-angle quarter-wave plates using multi-twist retarders" by Li L, Escuti MJ in Opt Express. 2021; 29 (5): 7464-7478 discloses achromatic wide-angle quarter-wave plates, which is hereby incorporated in its whole by reference.

The article of "Sole-style birefringent color filters based on multi-twist retarders" by Li L., Shi S. Escuti M J in In: Hahlweg C F, Mulley J R, eds. Novel Optical Systems, Methods, and Applications XXIII. Vol 11483. SPIE; 2020: 136-149. doi: 10.1117/12.2569133 discloses sole-style birefringent color filters, which is hereby incorporated in its whole by reference.

The article of "Improved saturation and wide-viewing angle color filters based on multi-twist retarders" by Li L, Shi S, Escuti MJ in Opt Express. 2021; 29 (3): 4124-4138 discloses filters based on multi-twist retarders, which is hereby incorporated in its whole by reference.

SUMMARY OF THE INVENTION

One object of this disclosure is to provide a new technical solution for an optical waveguide system.

According to a first aspect of the present disclosure, there is provided an optical waveguide system, comprising: a waveguide; an input coupler, provided at an input side of the waveguide and coupling a light into the waveguide, wherein the light includes a first color component and a second color component; and an output coupler, provided at an output side of the waveguide and coupling the light out of the waveguide, wherein the output coupler includes: a first polarization color filter, which converts the first color component of a first polarization state into the first color component of a second polarization state without changing the second color component of initial polarization state; a first polarization volume grating, which couples the first color component out of the waveguide; a second polarization color filter, which converts the second color component of the first polarization state into the second color component of the second polarization state without changing the first color component of the first polarization state; a second polarization volume grating, which couples the second color component out of the waveguide.

According to a second aspect of the present disclosure, there is provided an electronic device, comprising: a display, which generates an image light; and an optical waveguide system according to an embodiment, which receives the image light.

According to an embodiment of this disclosure, a performance of an optical waveguide system can be improved.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the invention.

DETAILED DESCRIPTION OF THE EMBODIMENTS

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

In a polarization volume grating based waveguide system, it is difficult to couple a light out of a waveguide with desired qualities because the light may include various wavelength.

The inventor has investigated multiple polarization volume gratings which is respectively optimized for various primary colors.

In the embodiments, the PBGs-stack is made of two or three PBGs and some other polarization elements which are respectively optimized for one primary color. In various embodiments, due to the narrow angle/wavelength response of the PBGs, the stack of optimized PBGs can be employed to use polarization to separate different wavelength of light, and Jet it incident onto respective optimized PBGs to create high-efficient out-coupling of the visible light.

Figure 1:
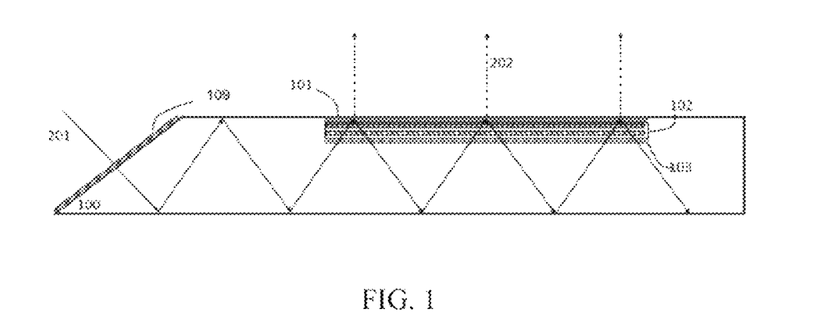
FIG. 1 shows an optical waveguide system according to an embodiment.

FIG. 1 shows an optical waveguide system. In FIG. 1, the optical waveguide system comprises a waveguide 100, an input coupler 109 and an output coupler 101, 102, 103.

In the configuration of FIG. 1, the waveguide 100 with index $n_w$ has a wedge or can be a planar WG with prism on top (input coupler 109) to couple the incident unpolarized polarized light 201 emerged from the displays into the WG. The light 201 undergoes TIR, and hit the element 103, which is a type of index-matching layer with index $n_1<n_w$. The light then hit the element 102, which is composed of several polarization elements and two PBGs. After this, the RCP-polarized light can be diffracted by PBGs. Finally, the output light transmits through element 101, which is also index-matching layer with index $n_2$. The element 103 and element 101 might have the same or close index. The final out-coupled light is 202.

The input coupler is provided at an input side of the waveguide 100 and couples a light 201 into the waveguide 100. The light includes a first color component 210 and a second color component 212.

The output coupler 101, 102, 103 is provided at an output side of the waveguide 100 and couples the light out of the waveguide 100. The out-coupled light is marked as 202.

Figure 2:
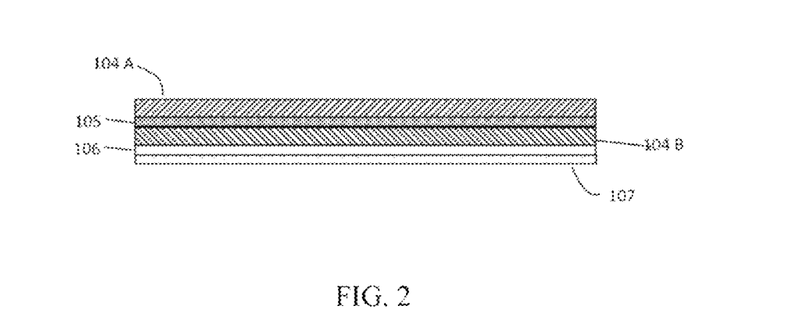
FIG. 2 shows an output coupler of the optical waveguide system in FIG. 1.

As shown in FIG. 2, the output coupler 101, 102, 103 includes: a first polarization color filter 106, a first polarization volume grating 104B, a second polarization color filter 105, and a second polarization volume grating 104A.

The first polarization color filter 106 converts the first color component of a first polarization state into the first color component of a second polarization state without changing the second color component of the first polarization state. The first polarization volume grating 104B couples the first color component out of the waveguide 100. The second polarization color filter 105 converts the second color component of the first polarization state into the second color component of the second polarization state without changing the first color component of the first polarization state. The second polarization volume grating 104A couples the second color component out of the waveguide 100.

The input coupler 109 may include a linear polarizer, which converts the light 201 into the light of a linear polarization state. The light of the linear polarization state travels in the waveguide 100.

The output coupler 101, 102, 103 may further include an achromatic quarter wave plate 107. The achromatic quarter wave plate 103 converts the light of the linear polarization state into the light of the first polarization state. The light of the first polarization state is processed in the output coupler 101, 102, 103.

In the embodiment of FIG. 1 and FIG. 2, the first polarization volume grating 104B and the second polarization volume grating 104A are transmissive polarization volume gratings, the output coupler 101, 102, 103 is installed at an upper bound of the waveguide 100. The first polarization volume grating 104B converts the first color component of the second polarization state into the first color component of the first polarization state.

For example, the first color component is red light and the second color component is green light.

In an example, the light further includes a third color component. For example, the third color component is blue light.

The first polarization color filter 106 further converts the third color component of the first polarization state into the third color component of the second polarization state. The first polarization volume grating 104B further converts the third color component of the second polarization state into the third color component of the first polarization state and couples the third color component out of the waveguide 100.

The element 102 is a stack made of two PBGs to enable color multiplexing and polarization management of RGB. FIG. 2 shows the structure of the stack 102. All the elements included in the stack 102 can use spin-coating technique to spin-coat LCP film. Such LCP film usually has the thickness of no more than 1 mm. The small thickness of element 105, 106 and 107 makes these elements have supreme wide-angle performance of up to ±60°. In the PBGs-based WG system, calculating the Fresnel equation on the wedge interface on the WG 100 in FIG. 1, the angle range is enough to cover the image with FOV=30° shown on the displays. The element 107 may be a wide angle achromatic QWP (AQWP). The element 106 may be a polarization color filter (PCF) that imposed half-wave (HW) retardation onto red and blue lights, and full-wave (FW) retardation on green light. Element 104B is polarization Bragg grating (PBG) or polarization volume gratings (PVG) which is optimized for red and blue light. Therefore, the PCF 106 has the ability to only flip the circular polarization of red and blue light, while leaving green polarization intact. Element 105 is a PCFs that imposed HW retardation on green light, and FW retardation on blue light. It has the ability to only flip the circular polarization of green light, and leaves the polarization of red and blue light intact. Finally, the element 104A is a PBG or PVG optimized for green.

Figure 3:
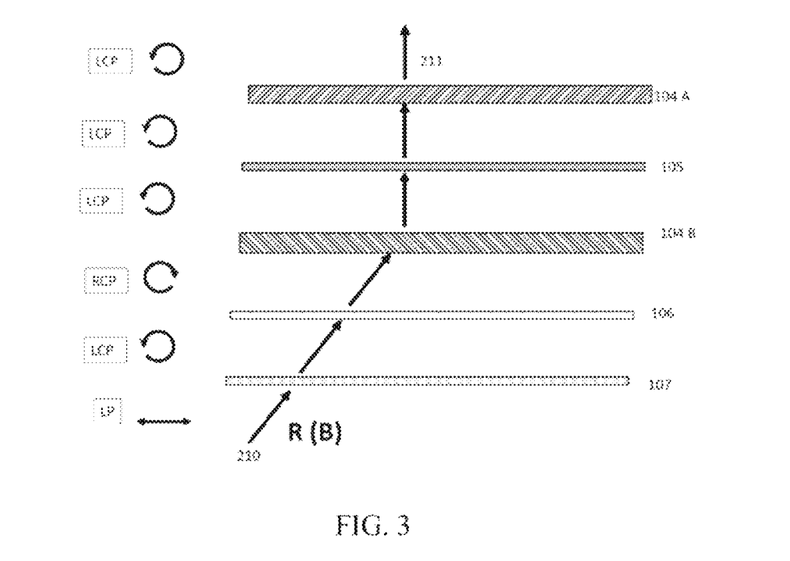
FIG. 3 shows polarization evolutions of red and blue light in the output coupler of FIG. 2.
Figure 4:
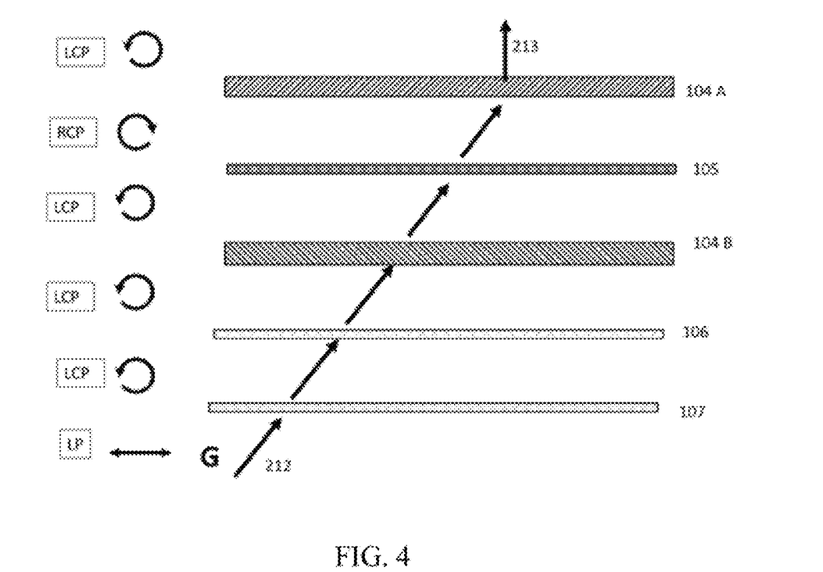
FIG. 4 shows polarization evolutions of green light in the output coupler of FIG. 2.

FIG. 3 shows polarization evolutions of the first color component in the output coupler of FIG. 2. FIG. 4 shows polarization evolutions of the second color component in the output coupler of FIG. 2. The out-coupling process will be described with reference to FIG. 3 and FIG. 4. For example, in FIG. 3, the light 210, 211 include red light and blue light.

As shown in FIG. 3, the red and blue light 210 is a linear polarized light. When the light goes through the achromatic quarter-wave plate 107, it becomes a left-hand circular polarization (LCP) light. The LCP light goes through the first polarization color filter 106 and becomes a right-hand circular polarization (RCP) light. The RCP light goes into the first polarization volume grating 104B and becomes back to LCP light. The LCP light is coupled out of the waveguide 100 by the first polarization volume grating 104B via the second polarization color filter 105 and the second polarization volume grating 104A without changing its polarization. The light 211 goes out of the waveguide 100.

As shown in FIG. 4, the green light 212 is a linear polarized light. When the light goes through the achromatic quarter wave plate 107, it becomes a left-hand circular polarization (LCP) light. The LCP light goes through the first polarization color filter 106 and the first polarization volume grating 104B without changing its polarization. The LCP light goes through the second polarization color filter 105 and becomes RCP light. The RCP light goes into the second polarization volume grating 104A and becomes back to LCP light. The LCP light is coupled out of the waveguide 100 by the second polarization volume grating 104A. The light 213 goes out of the waveguide 100.

The output coupler 101, 102, 13 may include at least one index-matching layer, which is provided on at least one side of the output coupler.

To further illustrate the color multiplexing scheme using polarization separation, the polarization evolution varied by each interface is illustrated in FIG. 3a-b. In FIG. 3a, to start with, the incident light of red or blue (210) is LP after modified the element 109, and is incident onto element 107 (AQWP), which has the slow axis of ~45° and modifies the LP into LCP. The LCP red or blue is then entering the element 106, a PCFs that imposed HW retardation to light 210. As mentioned before, the HW retardation can flip the light LCP into RCP, making it appropriate polarization for the grating 104 B to enable transmission diffraction of the PBGs 104B. Up to this point, only red and blue has the LCP, while green is still RCP, because the element 106 cannot impose HW retardation on green, but FW retardation. For green, FW retardation does not have the function of flipping polarization. Therefore, the element 104B, which is designed to have LCP as input for +1 transmission diffraction, is transparent for green. At the same time, red and blue is diffracted by element 104 B and obtained LCP. The light continue hits the element 105, which is PCFs that impose FW retardation for red and blue, therefore, element 105 is transparent to light 210. Because of the LCP, the element 104A which is designed for RCP input, is also transparent to light 210. Therefore, the light 210 can maintain the polarization LCP and is outcoupled as light 211.

The polarization evolution varied by each interface is further summarized as below. In FIG. 3a, to start with, the incident light of red or blue (210) is a LP light after modified by the element 109, and is incident onto element 107 (AQWP), which has the slow axis of ~45° and modifies the LP light into LCP light. The LCP red or blue light is then entering the PCF 106, which imposes HW retardation to the LCP light 210. As mentioned before, the HW retardation can flip the light LCP into RCP, making it being appropriately polarized for the grating 104B to enable transmission diffraction of the PBGs 104B. Up to this point, only red and blue has the LCP, while green is still RCP, because the element 106 cannot impose HW retardation on green, but FW retardation. For green light, FW retardation does not have the function of flipping polarization. Therefore, the element 104B, which is designed to have LCP as input for +1 transmission diffraction, is transparent for green. At the same time, the red and blue light is diffracted by element 104 B and becomes LCP light. The light continue hits the element 105, which is a PCF that impose FW retardation for red and blue. Therefore, element 105 is transparent to light 210. Because of the LCP, the element 104A, which is designed for RCP input, is also transparent to light 210. Therefore, the light 210 can maintain the polarization LCP and is out-coupled as light 211.

For green light 212 in FIG. 4, the LP light 212 becomes LCP after transmitting element 107 (AQWP), and maintains LCP after gaining FW retardation at element 106 (PCFs for red and blue). The LCP light continues to be transparent after transmitting the element 104B (PBG for RCP). When light 212 hit the element 105, a HW retardation is imposed on it and its polarization is flipped, making it ready to enter the PBG 104 A. The light 212 is diffracted as +1 order transmission as light 213, which has the LCP polarization.

Up to these point, the red, green blue light are all LCP polarized as output light, making it much easier for the lateral polarization management.

Figure 5:
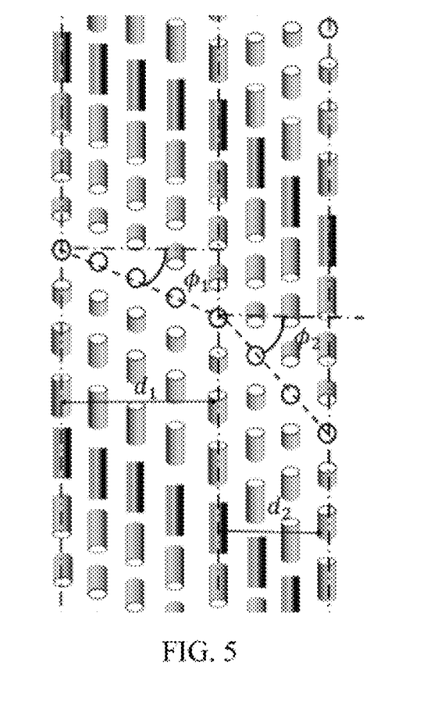
FIG. 5 shows a schematic structure of a polarization volume grating according to an embodiment.

FIG. 5 shows a schematic structure of a polarization volume grating according to an embodiment. The polarization volume grating PVG has two or three layers, with each layer descripted as $(\phi_i, d_i)$, where $\phi_i$ is a twist angle, and $d_i$ is the thickness. The configuration of LC grating structure is shown in FIG. 4, in which the polarization volume grating PVG has two layers. Each layer has its own independent twist angle and thickness. The twist angle is created by the chiral LC molecule mixed with non-chiral LC molecule. The ratio of the chiral and non-chiral molecule mass determines the twist rate, which creates the twist angle within certain thickness. Light with circular polarization enter incident the PVGs from left to right, and undergoes Bragg reflection.

The design parameter can be found by means of employing the multivariable optimization algorithm by expressing each layer twist angle and thickness as variable, as well as the period of the grating. The merit function $f$ of specific color can be written as follow:

$$f_k(d_1,\phi_1,d_2,\phi_2,d=[1-\eta_1(\theta,\psi)]^2 \qquad (1)$$

where k=r, g, b represents three central wavelengths $\lambda_c$=450 nm, 530 nm, 630 nm. Angle $\theta$ and $\psi$ represents the polar angle and azimuth angle of the incident light respectively. In the system discussed, the merit function should also consider the incident angle rang which is $\theta \in (40°, 60°)$.

Figure 6:
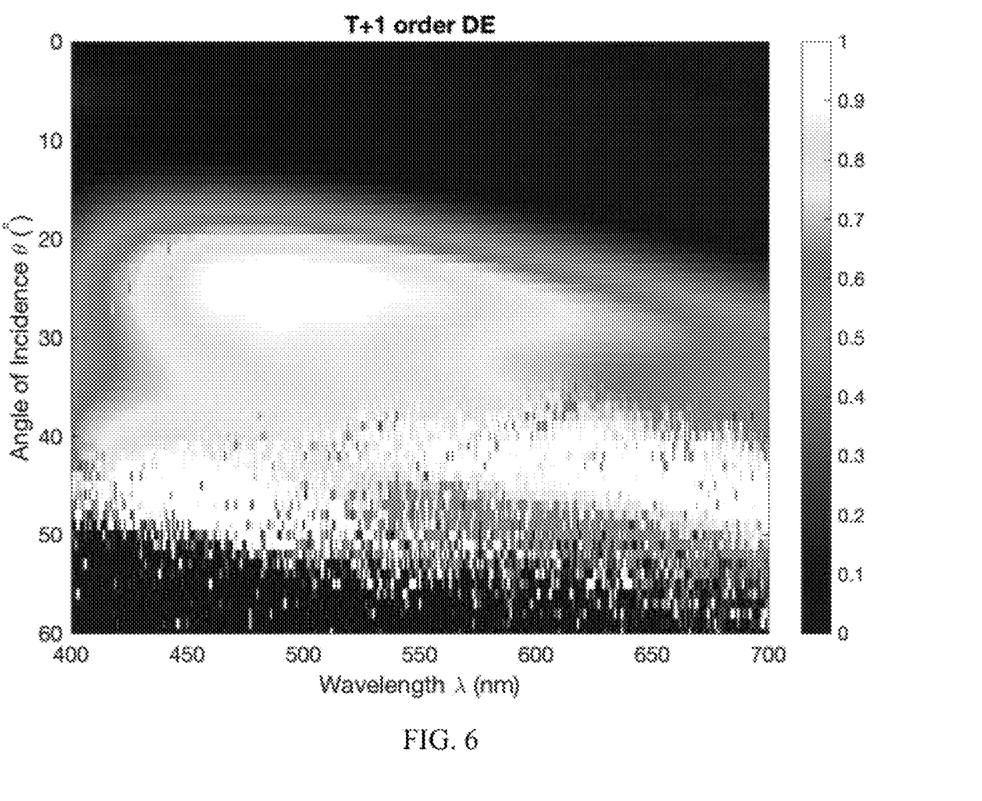
FIG. 6 and FIG. 7 show graphs of diffraction efficiencies of polarization volume gratings according to an embodiment.
Figure 7:
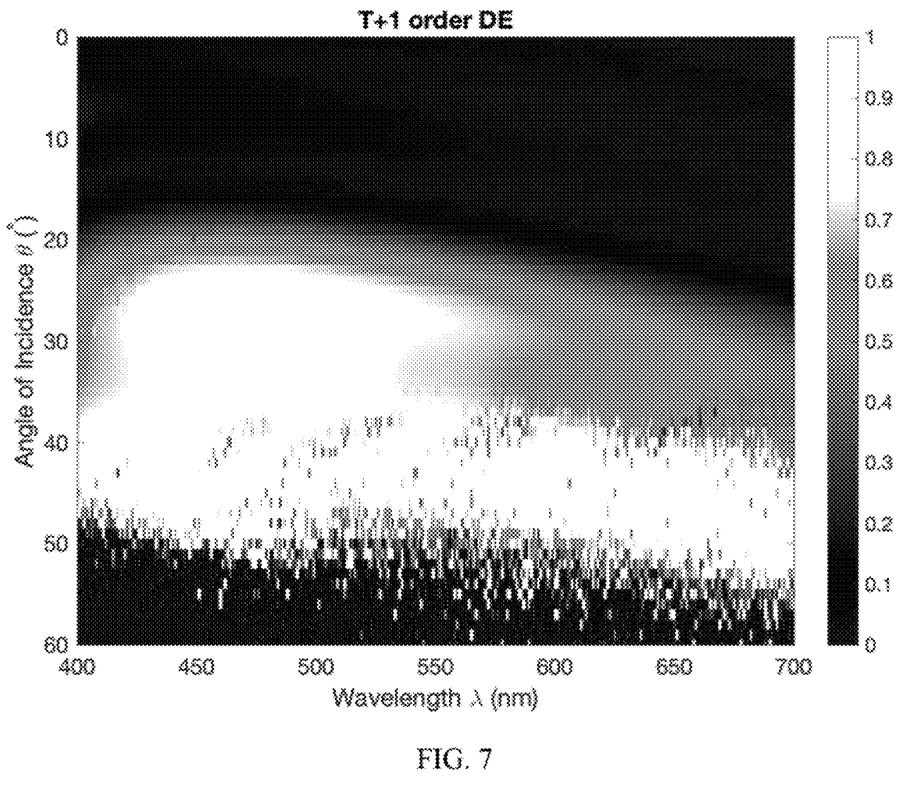
Figure 8:
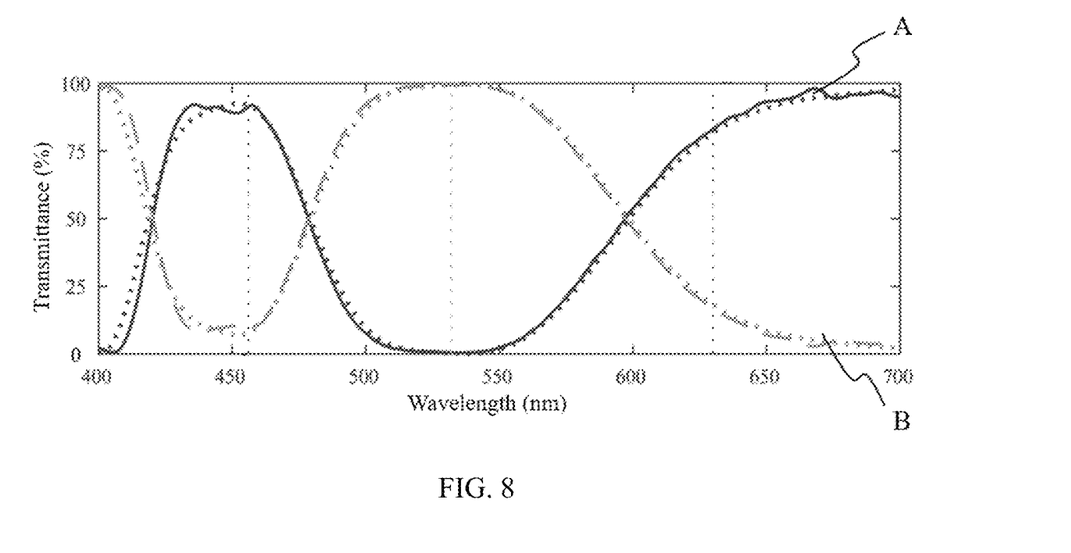
FIG. 8 shows transmittance of polarization color filters according to an embodiment.

The angle and wavelength response of grating 104A and grating 104B is illustrated in FIG. 6 and FIG. 7, while the transmittance of the PCFs of element of 106 and element 105 is illustrated in FIG. 8. It can be seen that both the PCFs and the PBGs are optimized for the angle range $\theta \in (40°, 60°)$, which belongs to the FOV expanded on the wedged WG.

FIG. 6 shows diffraction efficiency varied by angle and wavelength of element 104B, optimized for red and blue incident angle range (40°, 60°).

FIG. 7 shows diffraction efficiency varied by angle and wavelength of element 104A, optimized for green incident angle range (40°, 60°).

FIG. 8 shows transmittance of PCFs 106 and 105 between cross polarizer. The line A is for the PCF element 106, while the line B is the PCF element 105.

Figure 9:
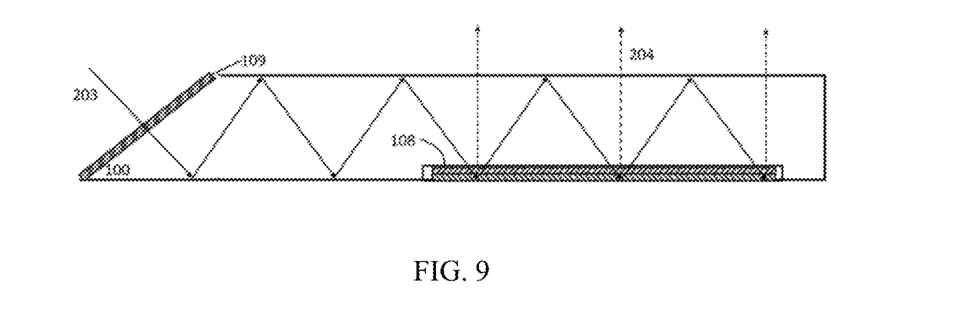
FIG. 9 shows an optical waveguide system according to another embodiment.
Figure 10:
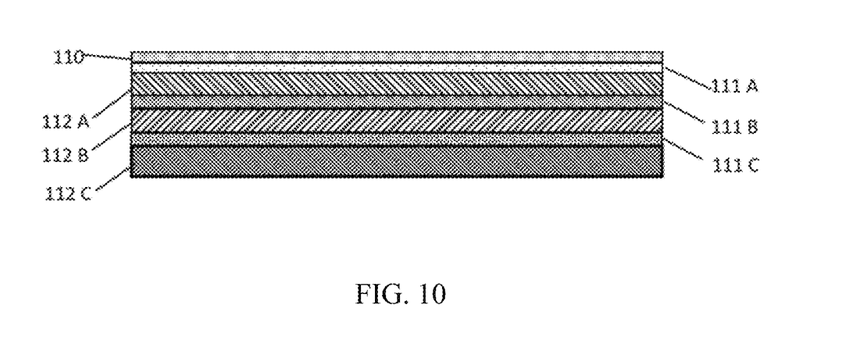
FIG. 10 shows an output coupler of the optical waveguide system in FIG. 9.

FIG. 9 shows an optical waveguide system according to another embodiment. FIG. 10 shows an output coupler of the optical waveguide system in FIG. 9. In FIG. 10, the first polarization volume grating 112A and the second polarization volume grating 112B are reflective polarization volume gratings. The output coupler 108 is installed at a lower bound of the waveguide 100.

The light may further include a third color component. As shown in FIG. 10, the output coupler 108 further includes: a third polarization color filter 111C and a third polarization volume grating 112C. The third polarization color filter 111C converts the third color component of the first polarization state into the third color component of the second polarization state without changing the first color component of the first polarization state and the second color component of the first polarization state. The third polarization volume grating 112C couples the third color component out of the waveguide.

For example, the first color component is a red component, the second color component is a green component and the third color component is a blue component.

Figure 11:
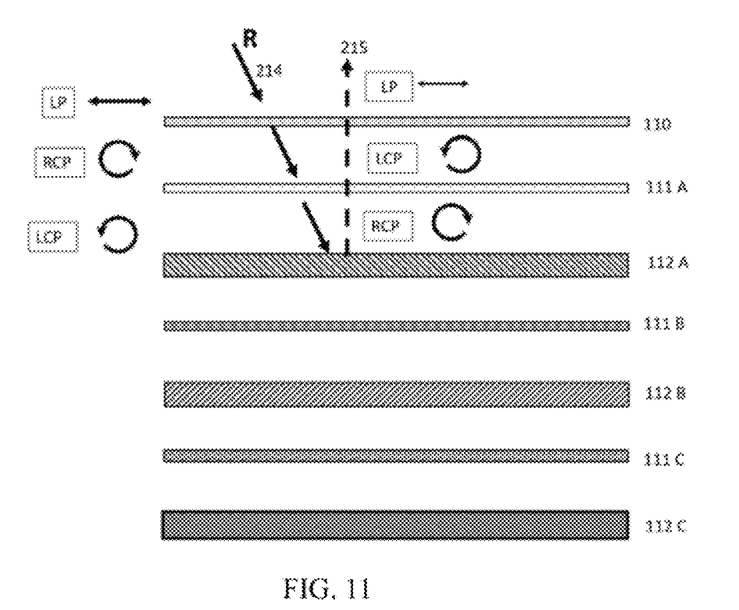
FIG. 11 shows polarization evolutions of red light in the output coupler of FIG. 10.
Figure 12:
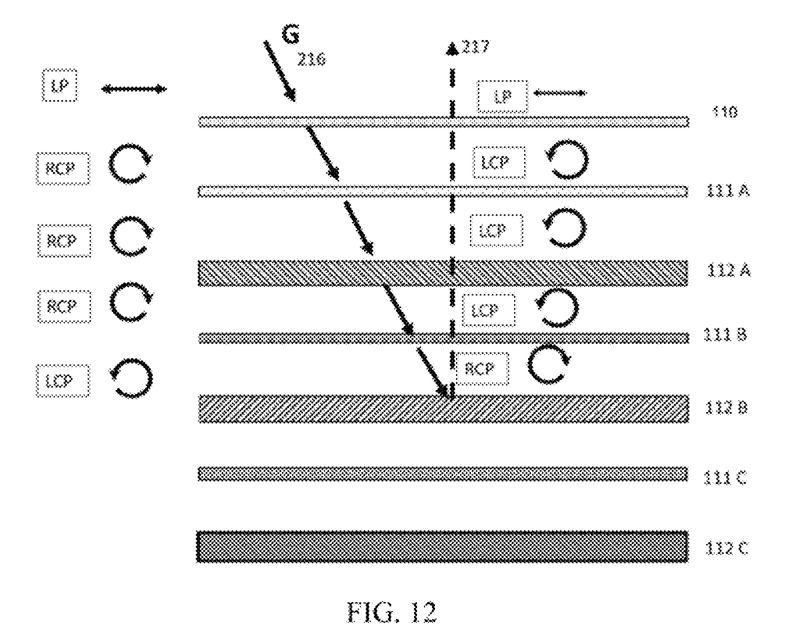
FIG. 12 shows polarization evolutions of green light in the output coupler of FIG. 10.
Figure 13:
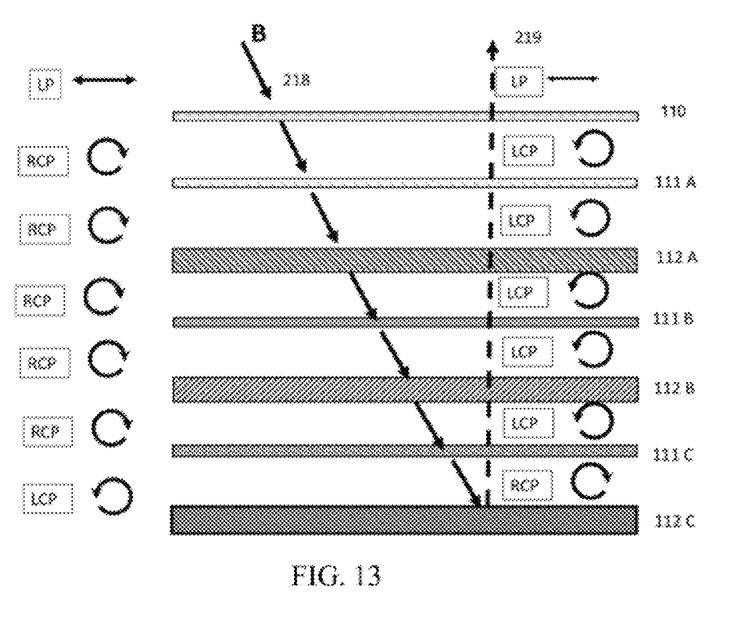
FIG. 13 shows polarization evolutions of blue light in the output coupler of FIG. 10.

FIG. 11 shows polarization evolutions of red light in the output coupler of FIG. 10. FIG. 12 shows polarization evolutions of green light in the output coupler of FIG. 10. FIG. 13 shows polarization evolutions of blue light in the output coupler of FIG. 10.

For example, the first polarization state is a right-hand circular polarization state or a left-hand circular polarization state, and the second polarization state is a left-band circular polarization state or a right-hand circular polarization state.

The out-coupling process will be described with reference to FIG. 11. FIG. 12 and FIG. 13.

As shown in FIG. 11, the red light 214 is a linear polarized light. When the light goes through the achromatic quarter wave plate 110, it becomes a right-hand circular polarization (RCP) light. The RCP light goes through the first polarization color filter 111A and becomes a left-hand circular polarization (LCP) light. The LCP light goes into the first polarization volume grating 112A and becomes back to RCP light. The RCP light is coupled out of the waveguide 100 by the first polarization volume grating 112A via the first polarization color filter 111A and the achromatic quarter wave plate 110. The first polarization color filter 111A change the RCP light to LCP light and the achromatic quarter wave plate 110 changes the LCP light to a linear polarized light 215 out of the waveguide 100.

In FIG. 11, the linear polarized light 214, represents red light, gain RCP by AQWP element 110, and is flipped by the element 111A, which is PCFs imposing HW retardation on red light. The light 214 then gain the LCP and is able to meet the diffraction requirement of element 112A, which is designed for the LCP as input and reflected −1 order reflection. The diffracted light then gains the RCP polarization as reflected diffraction. The light 214 is then again imposed HW retardation by the element 111A, and become LP light again as output light 215.

As shown in FIG. 12, the green light 216 is a linear polarized light. When the light goes through the achromatic quarter wave plate 110, it becomes a right-hand circular polarization (RCP) light. The RCP light goes through the first polarization color filter 111A and the first polarization volume grating 112A without changing its polarization. The RCP light goes through the first polarization color filter 111B and becomes LCP light. The LCP light goes into the second polarization volume grating 112B and becomes back to RCP light. The RCP light is coupled out of the waveguide 100 by the second polarization volume grating 112B via the second polarization color filter 111B, the first polarization volume grating 112A, the first polarization color filter 111A and the achromatic quarter wave plate 110. The second polarization color filter 111B change the RCP light to LCP light and the achromatic quarter wave plate 110 changes the LCP light to a linear polarized light 217 out of the waveguide 100.

For green light 216 in FIG. 12, the light gain RCP by AQWP element 110 and remain RCP until it hits the PCFs operates on green, which imposes HW retardation on green solely, forcing the light 216 to flip the polarization as LCP. The light 216 is then able to meet the diffraction requirement of PBGs 112B and got diffracted as −1 order reflection and gain RCP polarization. Element 111B again impose HW retardation on light 216, making it to have LCP polarization, which is maintained until the light hits back the AQWP element 110 to gain the reverse quarter-wave (QW) retardation, which makes the polarization becomes LP again for output light 217.

As shown in FIG. 13, the green light 218 is a linear polarized light. When the light goes through the achromatic quarter wave plate 110, it becomes a right-hand circular polarization (RCP) light. The RCP light goes through the first polarization color filter 111A, the first polarization volume grating 112A, the second polarization color filter 111B, the second polarization volume grating 112B without changing its polarization. The RCP light goes through the third polarization color filter 111C and becomes LCP light. The LCP light goes into the third polarization volume grating 112C and becomes back to RCP light. The RCP light is coupled out of the waveguide 100 by the third polarization volume grating 112C via the third polarization color filter 111C, the second polarization volume grating 112B, the second polarization color filter 111B, the first polarization volume grating 112A, the first polarization color filter 111A and the achromatic quarter wave plate 110. The third polarization color filter 111C change the RCP light to LCP light and the achromatic quarter wave plate 110 changes the LCP light to a linear polarized light 219 out of the waveguide 100.

For the blue light 218, the previous polarization change is similar with green light 216, until the light 218 hits the element 111B, which now not imposing HW retardation but FW retardation for light 218, resulting to transparency of 112B. The light continues to hit element 111C, which imposes the HW retardation for light 218, and making it avaible for element 112C to occurs for diffraction. When light 218 diffracted back, the RCP can be obtained. The 111C then again impose HW retardation for light 216 and flip the RCP to LCP. Such LCP continues to keep until the light hit the AQWP element 110 to gain the reverse quarter-wave (QW) retardation, which makes the polarization becomes LP again for output light 219.

Figure 14:
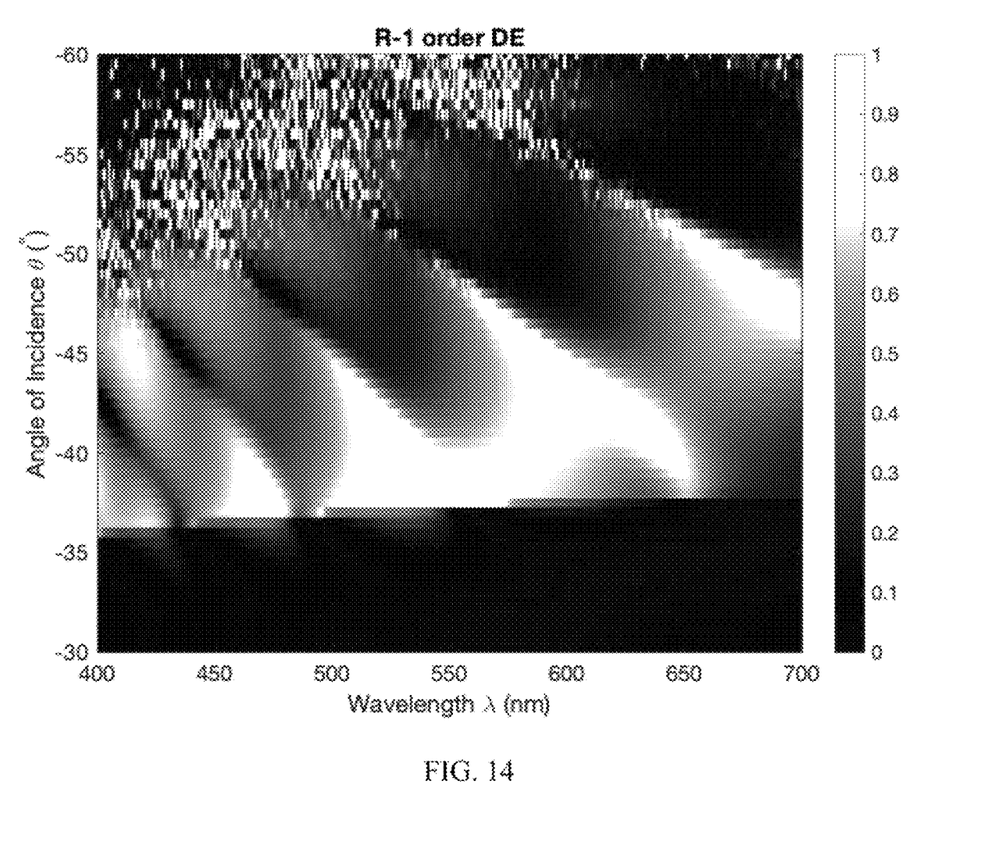
FIG. 14, FIG. 15 and FIG. 16 show graphs of diffraction efficiencies of polarization volume gratings according to another embodiment.
Figure 15:
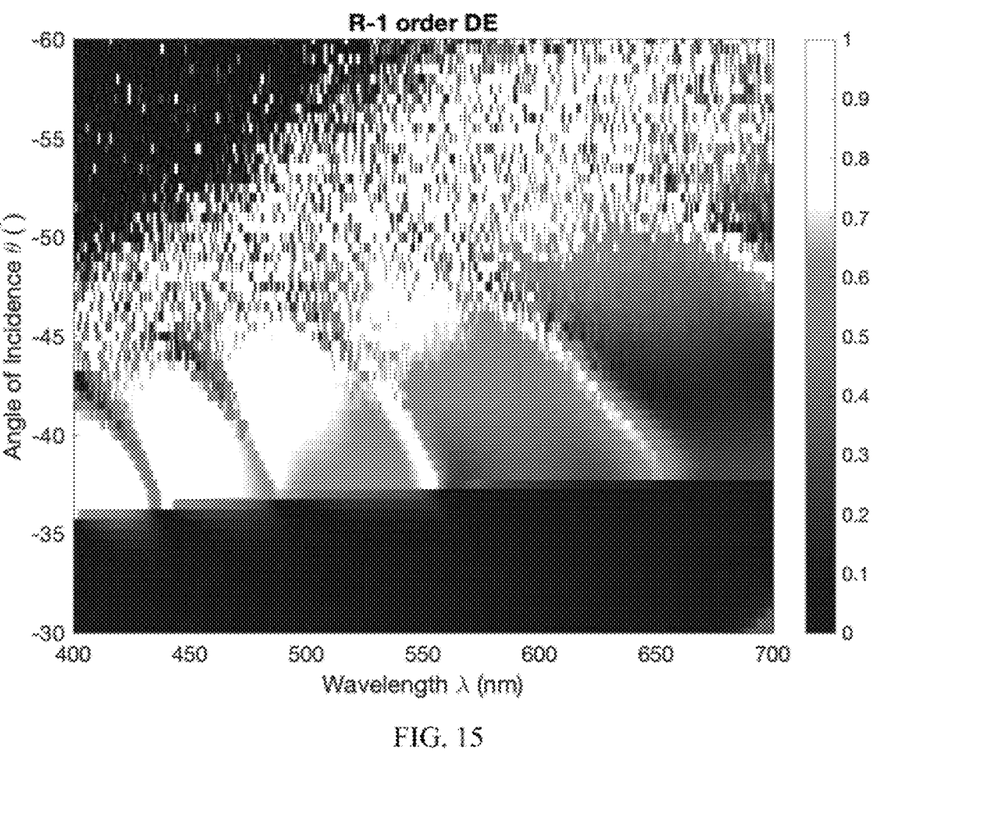
Figure 16:
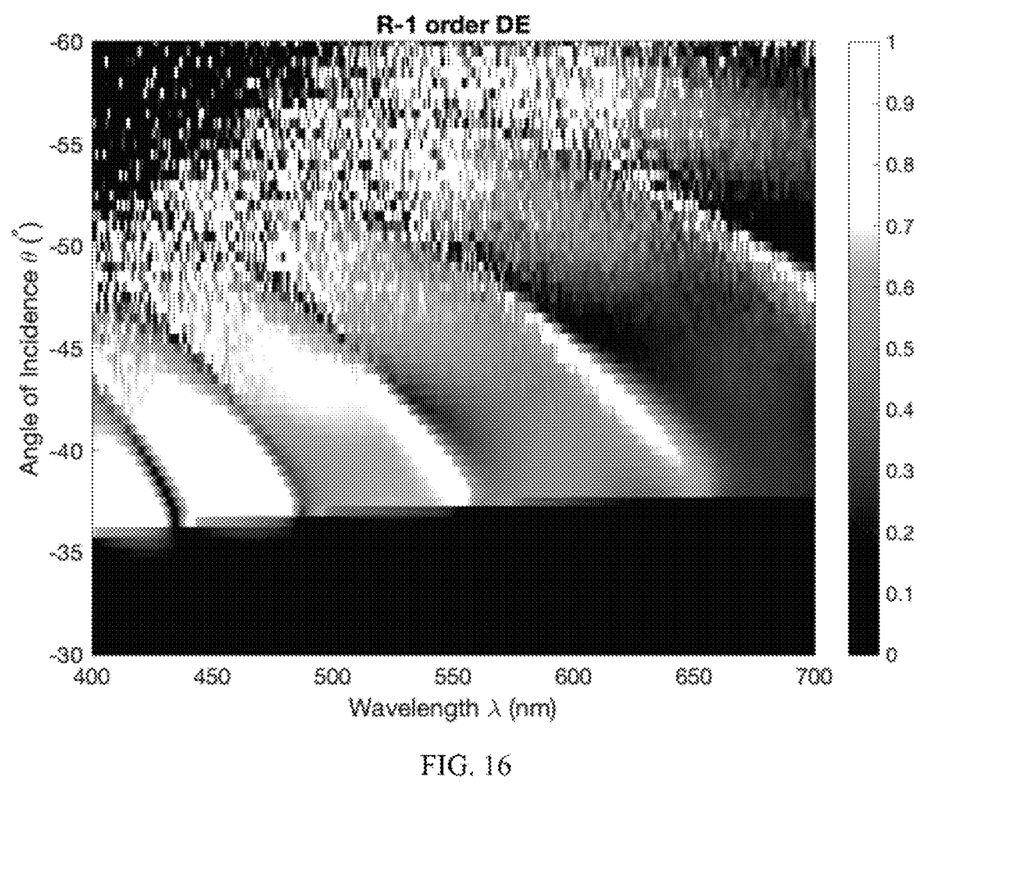
Figure 17:
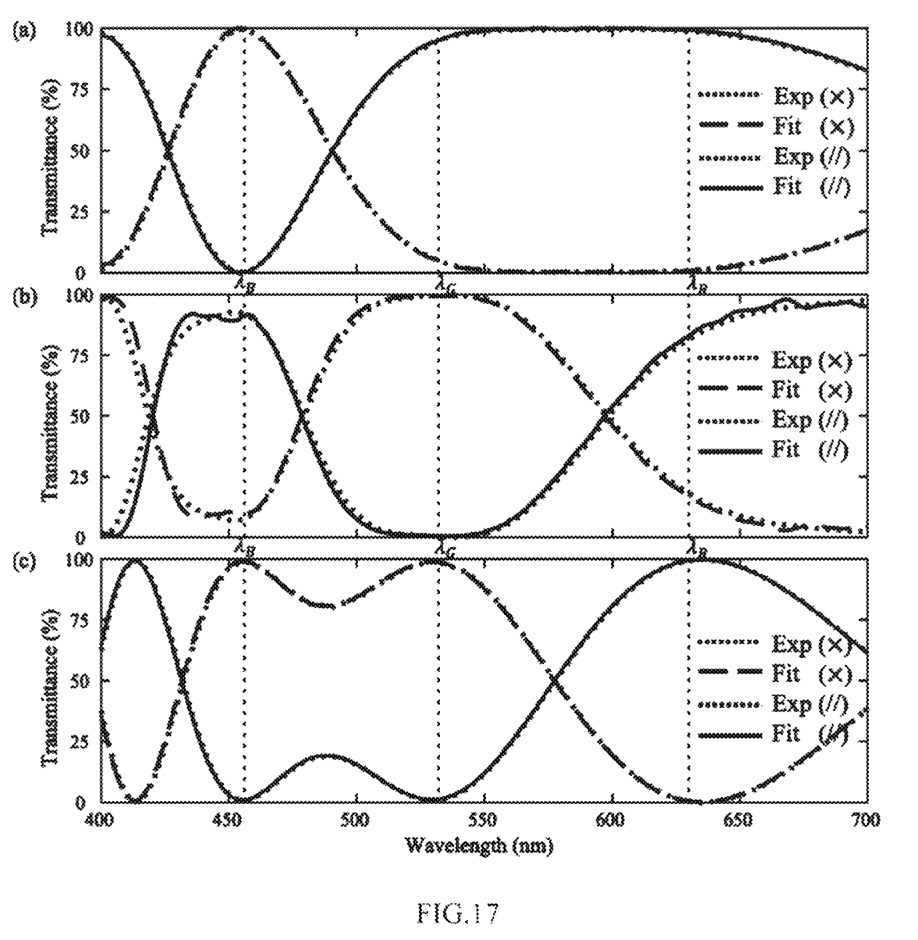
FIG. 17 shows transmittance of polarization color filters according to another embodiment.

The angle and wavelength response of grating 112A. 112B, and 112C are illustrated in FIG. 14 to FIG. 16, while the transmittance of the PCFs of element of 111A, 111B, and 111C are illustrated in FIG. 17.

FIG. 14 shows diffraction efficiency varied by angle and wavelength of element 112A, optimized for red incident angle range (40°, 60°).

FIG. 15 shows diffraction efficiency varied by angle and wavelength of element 112B, optimized for green incident angle range (40°, 60°).

FIG. 16 shows diffraction efficiency varied by angle and wavelength of element 112C, optimized for blue incident angle range (40°, 60°).

FIG. 17 shows transmittance of element 111A in (c) marked as "r" line, 111B (b) marked as "g" line, 111C (a) marked as "b" line.

It can be seen that both the PCFs and the PBGs are optimized for the angle range $\theta \in (40°, 60°)$, which is belongs to the FOV expanded on the wedged WG.

Figure 18:
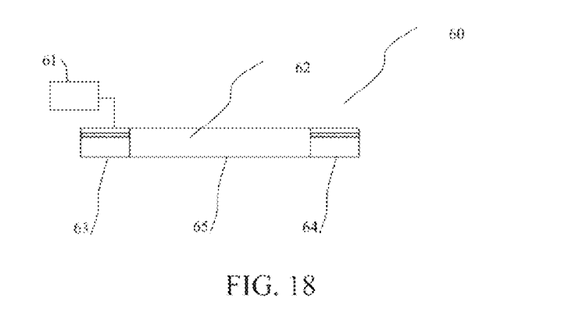
FIG. 18 shows a schematic block diagram of an electronic device according to an embodiment.

FIG. 18 shows a schematic block diagram of an electronic device according to an embodiment.

In FIG. 18, the electronic device 60 comprises a display 61 and an optical waveguide system 62. The display 61 generates an image light.

The optical waveguide system 62 includes an input coupler 63, a waveguide 65 and an output coupler 64 as described above. The optical waveguide system 62 may be the optical waveguide system as described above.

Figure 19:
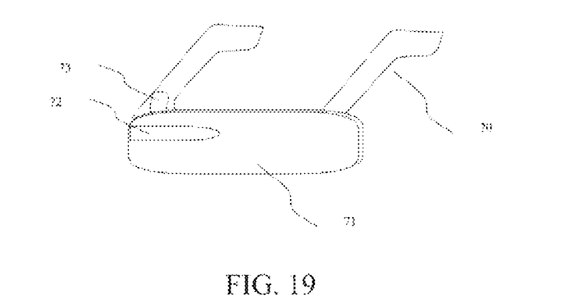
FIG. 19 shows an example of an electronic device.

FIG. 19 shows an example of an electronic device according to an embodiment. In FIG. 19, the electronic device 71 may be a near-eye display such as an AR glass. The electronic device 71 may include a display 73 and an optical display system 72.

Although some specific embodiments of the present invention have been demonstrated in detail with examples, it should be understood by a person skilled in the art that the above examples are only intended to be illustrative but not to limit the scope of the present disclosure.

What is claimed is:

1. An optical waveguide system for polarizing light including a first color component having a first polarization state, and a second color component having a first polarization state, and a third color component having a first polarization state, comprising:
    a waveguide having an input side and an output side;
    an input coupler, provided at the input side of the waveguide to couple the light into the waveguide; and
    an output coupler, provided at the output side of the waveguide to couple the light out of the waveguide,
    wherein the output coupler includes:
    a first polarization color filter, adapted to converts the first color component from the first polarization state into a second polarization state and convert the third color component from the first polarization state into a second polarization state without changing polarization of the second color component;
    a first polarization volume grating, adapted to convert the first color component from the second polarization state into the first polarization state and convert the third color component from the second polarization state into the first polarization state without changing polarization of the second color component, and couple the first color component and the third color component out of the waveguide;
    a second polarization color filter, adapted to converts the second color component from the first polarization state into a second polarization state without changing polarization of the first color component and the third color component;
    a second polarization volume grating, adapted to converts the second color component from the second polarization state into the first polarization state without changing polarization of the first color component and the third color component, and the couple the second color component out of the waveguide.

2. The optical waveguide system according to claim 1, wherein the input coupler includes a linear polarizer, adapted to convert the light into light having a linear polarization state,
    wherein the output coupler further includes an achromatic quarter-wave plate, adapted to convert the light having the linear polarization state into the light having the first polarization state.

3. The optical waveguide system according to claim 1, wherein
    the first polarization volume grating and the second polarization volume grating are transmissive polarization volume gratings,
    wherein the output coupler is installed at an upper bound of the waveguide.

4. The optical waveguide system according to claim 3, wherein the output coupler includes at least one index-matching layer, which is provided on at least one side of the output coupler.

5. The optical waveguide system according to claim 1, wherein the first color component is a red component, the second color component is a green component and the third color component is a blue component.

6. The optical waveguide system according to claim 1, wherein the first polarization state is a right-hand circular polarization state or a left-hand circular polarization state, and the second polarization state is a left-hand circular polarization state or a right-hand circular polarization state.

7. An electronic device, comprising:
    a display, which generates an image light; and
    an optical waveguide system according to claim 1, which receives the image light.

* * * * *